(12) United States Patent
Kurz et al.

(10) Patent No.: US 9,291,268 B2
(45) Date of Patent: Mar. 22, 2016

(54) LINE DUCT WITH A SERIES OF LAYERS

(75) Inventors: Ralf Kurz, Giengen (DE); Martin Heck, Zoschingen (DE); Michael Seibold, Blaustein (DE)

(73) Assignee: Hauff-Technik GmbH & Co. KG (DE)

( * ) Notice: Subject to any disclaimer, the term of this patent is extended or adjusted under 35 U.S.C. 154(b) by 261 days.

(21) Appl. No.: 14/000,784

(22) PCT Filed: Feb. 21, 2012

(86) PCT No.: PCT/EP2012/000752
§ 371 (c)(1),
(2), (4) Date: Aug. 30, 2013

(87) PCT Pub. No.: WO2012/113537
PCT Pub. Date: Aug. 30, 2012

(65) Prior Publication Data
US 2013/0328271 A1    Dec. 12, 2013

(30) Foreign Application Priority Data

Feb. 22, 2011  (EP) .................................... 11001454

(51) Int. Cl.
| | |
|---|---|
| *F16L 5/02* | (2006.01) |
| *F16J 15/10* | (2006.01) |
| *H02G 3/22* | (2006.01) |
| *F16L 5/10* | (2006.01) |
| *B23P 19/00* | (2006.01) |
| *F16L 5/08* | (2006.01) |

(52) U.S. Cl.
CPC ............... *F16J 15/104* (2013.01); *B23P 19/00* (2013.01); *F16L 5/08* (2013.01); *F16L 5/10* (2013.01); *H02G 3/22* (2013.01); *Y10T 29/49826* (2015.01)

(58) Field of Classification Search
CPC ....... F16J 15/0887; F16L 41/008; F16L 5/02; F16L 5/10; H02G 3/22
See application file for complete search history.

(56) References Cited

U.S. PATENT DOCUMENTS

| | | | |
|---|---|---|---|
| 6,107,571 A | 8/2000 | Damm | |
| 2012/0266409 A1* | 10/2012 | Andersson et al. | 16/2.2 |
| 2013/0113166 A1* | 5/2013 | Hjerpe | 277/606 |

FOREIGN PATENT DOCUMENTS

| | | |
|---|---|---|
| EP | 1 843 071 A1 | 10/2007 |
| EP | 2 131 085 A1 | 12/2009 |
| WO | 9702636 A1 | 1/1997 |

* cited by examiner

*Primary Examiner* — Gilbert Lee
(74) *Attorney, Agent, or Firm* — Wood, Phillips, Katz, Clark & Mortimer

(57) ABSTRACT

The invention relates to a line duct for sealing a wall opening through which a line passes, comprising an elastomer body with a series of layers surrounding the line. The elastomer body and the series of layers are made up here of a number of respective one-piece elastomer body parts (2a, b, c, d) with shells (4a, b, c, d), according to the invention there being arranged between the shells (4a, b, c, d) of an elastomer body part (2a, b, c, d) at least two shells (4a, b, c, d) of other elastomer body parts (2a, b, c, d).

14 Claims, 13 Drawing Sheets

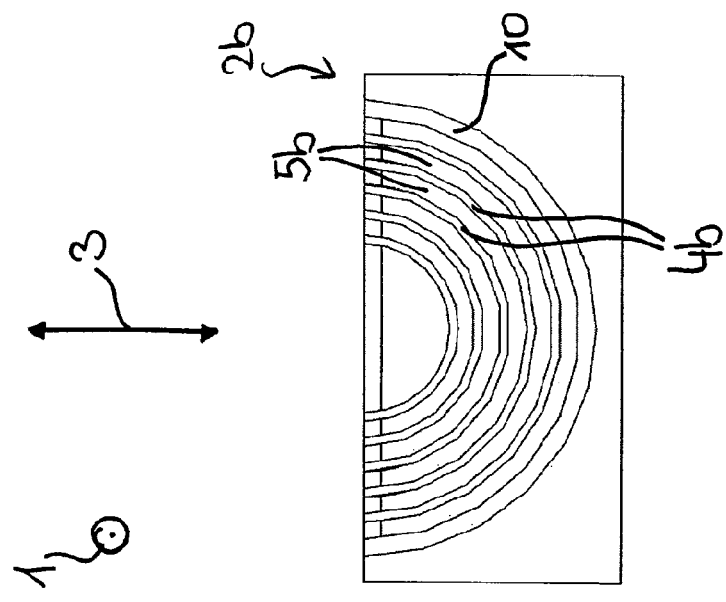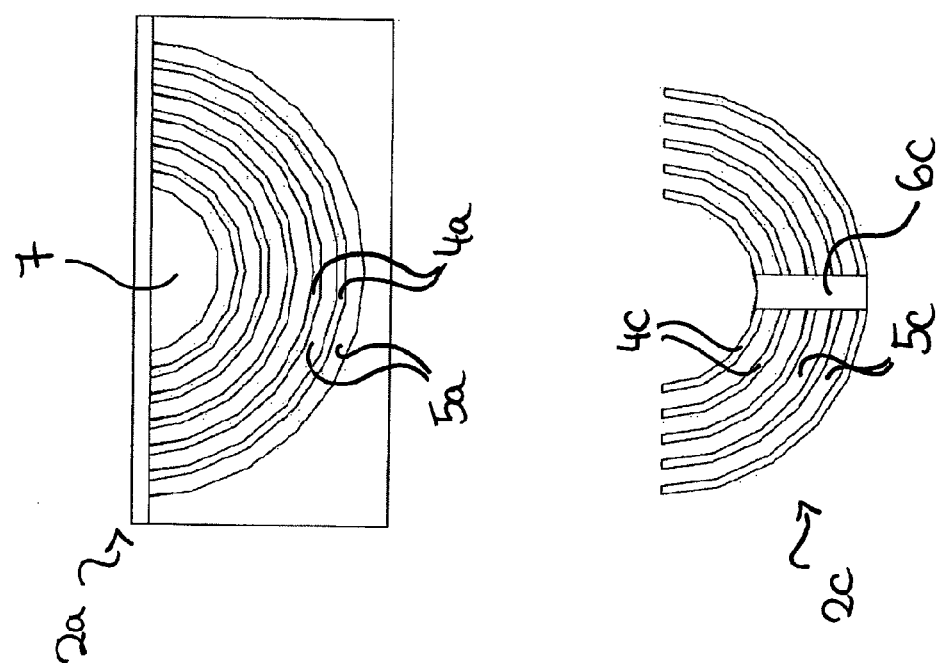
Fig. 2

LINE DUCT WITH A SERIES OF LAYERS

The present invention relates to a line duct comprising an elastomer body for establishing sealing closure of an opening in a wall through which a line passes.

In line ducts known from the prior art an elastomer body is deformed with a tensioning device and thereby rests, forming a seal, both against the line and also, for example, against the embrasure of a borehole, a frame inserted into an opening in the wall, or an inner wall of a pipe concreted into the wall or otherwise fastened in the latter. The tensioning device can thereby deform the elastomer body in the direction of the line or also transversely to the latter, and this should, however, restrict the present invention just as little as the specific configuration of a fastening and the sealing cross-over to the wall. In fact, in this case the elastomer body is of interest.

In practice, not only are different line types to be sealed, but especially also different line cross-sections. Since despite the deformation of the elastomer body when braced it is not possible to bridge any distance, in any case not with a sealing effect which is still satisfactory, a though hole of the elastomer body accommodating the line must be adapted to the cross-section of the line.

So that a fitter on the construction site does not then have to provide a plurality of different line ducts, there are known from the prior art, for example from EP 1 843 071 A1, elastomer bodies with a series of a number of layers interconnected by material bridges provided in the through hole which are then separated depending on the diameter of a line to be passed through and which can be taken out of the through hole. The production of such an elastomer body with a series of layers proves to be particularly complex here because for this purpose closed cutting lines must generally be drawn in a solid elastomer body with a cutting tool not passing completely through the latter in the line direction, and in the same number as the layers.

Therefore the most recent developments according to EP 2 131 085 A1 show elastomer bodies made up of elastomer body parts designed like combs in a cutting plane including the centre axis of the line, which then in this image therefore correspond to two combs pushed into one another with the teeth of the combs. In other words, the layers of the elastomer body parts have teeth such that they bite into one another like two cog wheels, i.e. there is always a layer of the other elastomer body, and so also a corresponding space, between two layers of an elastomer body part. The layers do not then have to be produced by complex cutting process because the elastomer body parts can also be produced with sufficiently large spaces, even in a corresponding mould, for example by injection moulding.

The object underlying the present invention is to provide an advantageous configuration of a line duct comprising an elastomer body with dimensions that can be adapted transverse to the direction of the cable.

According to the invention this object is achieved with a line duct for establishing sealing closure of an opening in a wall through which a line passes, comprising an elastomer body for sealing contact on said line made up of a plurality of one-piece elastomer body parts, it being possible to clamp said elastomer body with a tensioning device and in this way to press it onto said line such as to form a seal, said elastomer body parts being designed to produce, in an assembled state, a series of a number of neighbouring shells in respect of a direction determining a distance from a centre axis of said line, in a pressed state of said elastomer body said line being completely surrounded by said shells in each layer of said series, a plurality of in said distance direction consecutive shells being provided on at least one of said elastomer body parts and there being a space between two of said shells, next neighbouring in said distance direction, of said at least one elastomer body part, in which a shell of an elastomer body part different from said at least one elastomer body part forming said space is arranged, characterised in that in said space there are arranged a plurality of, in said distance direction, next neighbouring shells of at least one other of said elastomer body parts.

In order to remain with the image of the comb: There is therefore arranged between the closely adjacent teeth of an elastomer body part designed like a comb not just one tooth of another elastomer body part, but at least two. In this way on the one hand finely staggered adaptation to line cross-sections is advantageously possible with the elastomer body, and on the other hand the elastomer body part designed like a comb can still be produced in a corresponding shape, for example by injection moulding, casting or pressing plastic material.

The inventors have established that not any small shell thicknesses can be produced with an elastomer body with two combs biting into one another according to the prior art. The complementary space width must also be reduced to the same extent as the shell thickness so that for example in order to produce an elastomer body with 0.5 mm thick shells, spaces of this width are also to be provided, i.e. in a corresponding moulding tool the thickness of the intermediate walls negative to the spaces is then also only 0.5 mm. At the same time however the shells, and so the intermediate walls in the direction of the line, generally measure a few centimetres, and with some plastic moulding processes, such as for example injection moulding, apply high pressures to the moulding tool, and this is why the inventors fear deformation of the intermediate walls. These thin intermediate walls are also generally more sensitive, and so also in combination with pressure-less processes because deformation can also occur, for example, when removing from the mould. This applies all the more so when the intermediate walls are tapered towards their free ends for the purpose of simplified removal from the mould because then the intermediate wall thickness decreases further, and in the aforementioned example, for example, can also be just 0.3 mm.

By now providing according to the invention a plurality of shells neighbouring to one another in the distance direction in the space of an elastomer body part designed like a comb, the space and correspondingly the intermediate wall in a moulding tool can also be correspondingly held further and more strongly; as a result thin shells can advantageously also be produced in a moulding tool.

Within the context of this invention a shell is a body the expansion of which in the distance direction is substantially less than in the line and circulating direction. Since the invention is not restricted to cables and wall openings with a circular cross-section, a shell does not necessarily follow a (cylindrically) curved surface, but can also be level in form, for example in the case of a rectangular cross-section. A layer can then be constructed from a shell which can optionally also be cut through by a cut extending transversely to the cable, or from a number of, i.e. at least two, shells adjacent to one another in the circulating direction. In the case of a line with a circular cross-section the shells can then form rotating bodies, or, if a number of shells together form a layer, can be segments of the latter and have a common axis of rotation aligned in the direction of the line.

The line is completely surrounded by the shell or the shells of a layer, and this applies partially in any case in relation to the line direction to a pressed elastomer body, and not necessarily to a loosely assembled one; there may by all means still be spaces here which, for example, facilitate the assembly of the elastomer body, i.e. the pushing together of the shells.

In the overall disclosure no detailed distinction is made between the description of a line duct, a set or system of line ducts, processes for producing the latter and the application aspect of the invention; the overall disclosure is implicitly to be understood with regard to all of these categories. In particular with regard to the process features relating to assembly, for reasons relating to clarity reference is also made to the exemplary embodiments.

Purely as a precaution it is furthermore noted that details relating to a line, for example to a line direction or a distance away from the latter, do not mean that the line must actually also be guided by the elastomer body, but describe the geometry or properties, such as if a line were passed through and the elastomer body were optionally also pressed.

A series of layers according to the invention can be provided both in order to adapt to different line cross-sections and with regard to different wall openings for adaptation of the elastomer body outer circumference. Nevertheless, in the following, for the sake of clarity, adaptation to line cross-sections is primarily discussed.

The aforementioned advantages—an elastomer body part that can be produced in a mould on the one hand and a reduction of the shell thickness on the other hand—can also be achieved, for example, with just one elastomer body part designed (in its cross-section) like a comb and in the space or spaces of which for example two conventionally produced shells of another elastomer body part, separated from one another by a cut extending in the circulating direction, take hold. In this way up to four thin shells can be made available with just one cut including the complementary counter-piece, i.e. less complex cutting processes are therefore also required.

It is preferred, however, if the shells closely adjacent to one another in the space in the distance direction, i.e. the shells directly following one another in the distance direction, respectively belong to other elastomer body parts; this does not necessarily also have to apply to consecutive shells in the circulating direction. In so far as all of the respectively closely adjacent shells of the series in the distance direction respectively belong to different elastomer body parts, one can for example also totally dispense with cuts running in the circulating direction, and this makes particularly time- and cost-optimised production of the elastomer body parts possible.

For example therefore, an elastomer body part designed like a comb (in its cross-section) can be injection moulded, cast or pressed in a mould from a plastic material with separating walls corresponding to the spaces, and loose shells, also produced by such a process, for example closed rings, can then respectively be placed in the space.

Preferably, however, all of the shells in the series of shells, respectively a plurality of them, belong respectively to a single elastomer body part, and so there are no individual, loose shells, and this simplifies manipulation of the elastomer body parts when assembling the elastomer body and also simplifies manipulation of the latter by an installer because the number of individual parts is reduced.

In particular in embodiments with respectively a plurality of shells provided on one elastomer body, but not only in such ones, an elastomer body part can also be provided with a functional addition, i.e. for example with solid particles for EMC shielding, X-ray absorption or improvement of the fire protection properties.

In a further embodiment shells arranged in different spaces of the elastomer body part are combined to form an elastomer body part by means of a material bridge (in the following referred to in short as "bridge") provided on the end of the shells in the direction of the line and not extending over the whole face side of said shells, i.e. formed as one piece. As viewed in the direction of the line, with such an elastomer body part, despite the bridges combining the shells, the spaces between the shells are partially visible. Depending on the exact arrangement of the bridge too, when an elastomer body according to the invention is assembled, the shells of other elastomer body parts can then be "threaded in" on this partially not covered face side and be pushed into the spaces in the direction of the line past a correspondingly narrow bridge.

During this pushing past, the bridge can divert a little elastically or the shell to be pushed past can also be designed to be a little "shorter" in comparison to a closely adjacent shell in relation to the circulating direction, and completely surround the line together with a complementary "longer" shell and/or also only after pressing the elastomer body.

Preferably, in relation to the distance direction for each space only precisely one shell is connected to shells of the other spaces by the same bridge; it is further preferred if all of the shells are connected by respective bridges, i.e. there are no loose shells.

A bridge formed with the shells in the same production process, i.e. a bridge directly moulded onto the latter or moulded with the latter, is preferred here. A cavity corresponding to the bridge is then provided in the moulding tool, which advantageously, because it combines all of the shells of the elastomer body part, can serve at the same time as a channel distributing the plastic material to the shells or the corresponding cavities, for example as an injection channel in an injection moulding process.

In a further embodiment at least one section of the bridge is then arranged in relation to the face sides of the shells connected by it in the direction of the line, jumping back between the shells, and so the bridge is not "placed" on the face sides. On a face side of a next neighbouring shell a recess complementary to this section of the bridge is then provided in which said section is then arranged. If the bridge is provided, for example, exclusively between the shells, it then lies within the assembled elastomer body volume, so at best is flush against the face sides of the elastomer body.

Independently of whether the bridge is placed on the face sides of the shells connected by it or is at least partially arranged between the shells, when the elastomer body is being assembled it can advantageously serve as a stop if the shells provided on two different elastomer body parts are pushed into one another in the direction of the line.

In a further embodiment a mark is then provided on a face side of the bridge, preferably a notch. Such a mark can, for example, identify specific positions in the distance direction, i.e. for example specific diameters, or also specify a preferred separating line for cutting through the bridge.

In general the bridges can be designed such that they can be torn off without a tool or can also be configured such that a cutting tool is required for cutting through.

In a preferred embodiment, in every layer of the series at least two shells respectively in at least two boundary surfaces per layer are adjacent to one another, two of these boundary surfaces respectively of each layer producing together with respectively two boundary surfaces of the other layers a separating surface passing through the line which divides the series of layers and preferably the entire elastomer body. The separating surface is thus produced from the individual boundary surfaces together making it possible to lift up the series of layers; said boundary surfaces do not necessarily lie in a plane, however, and so the separating surface, for example in the case of boundary surfaces offset to one another in the circulating direction, can also be produced together with boundary surface sections connecting the boundary surfaces in which next neighbouring layers are adjacent to one another with their lateral surfaces.

If precisely such a separating surface is provided for the elastomer body, it preferably divides this into two (not necessarily symmetrical) halves. When fitting a corresponding duct, a specific number of shells can then be removed from each half depending on the cross-section of the line to be passed through, respectively starting at the separating surface, and the two halves can then be placed on the line so that the remaining shells then together surround the line.

This embodiment is also particularly suitable for sealing larger wall openings into which a plurality of line ducts are inserted together; however, the following explanations also apply generally, independently of this, to a plurality of ducts according to the invention.

These individual line ducts have a cross-sectional area perpendicular to the direction of the line in relation to the cross-sectional area of the wall opening such that they can be used together or also together with at least one tensioning device for sealing. In the first of these cases the elastomer bodies can then, for example, be braced in the direction of the line, for example with its own respective tensioning device. In the case of a tensioning device inserted into the wall opening together with the elastomer bodies, the elastomer bodies can, for example, be pressed transversely to the direction of the line, a tensioning device for at least two elastomer bodies typically being provided.

There can also be provided, for example, more elastomer bodies according to the invention than there are lines actually passed through, and the elastomer bodies through which a line does not pass can be closed by a blind plug sitting in the centre of the series of shells, optionally also formed integrally with an elastomer body part having shells. However, one like this is not only conceivable within the context of large wall openings, but can also be provided with other embodiments of the invention.

In the case of a separating surface totally dividing the elastomer body a bridge holding together the shells of the elastomer body preferably extends transversely to the direction of the line over the entire width of the shells connected by it and is thereby adjacent to the separating surface so that the shells are respectively held by the bridge at a corner. In this way the shells are stabilised, and this facilitates the pushing of the elastomer body parts into one another (see the figures). The shells are in any case stabilised by the bridge against turning in the circulating direction and optionally also against fanning out transversely to the direction of the line.

The presence of a separating surface does not in principle rule out further separating surfaces, and so the elastomer body can for example also be sub-divided into four elastomer body pieces by two separating surfaces. Nevertheless, for the sake of simplicity one will refer primarily to elastomer body halves; furthermore, the latter do not need to be of the same size either.

In a further embodiment there is then also provided on an elastomer body part other than the one having the first bridge a bridge which is adjacent to the first bridge. Preferably the second bridge extends here through complementary recesses in the face sides of the shells of the first elastomer body part. In this embodiment not all of the shells can be held directly at the corners, but at least as close as possible to the corners (only distanced from the latter in accordance with the dimensions of the other bridge(s)).

In a further embodiment an elastomer body part section is provided on at least two elastomer body parts with respectively a plurality of shells respectively in the distance direction outside of the series of shells, the elastomer body part sections together forming a sealing surface lying on the outer circumference of the elastomer body and continuous in relation to the direction of the line. An elastomer body part section is preferably produced here in the same moulding tool in one step with the series of shells. The same elastomer body part therefore makes available both a sealing surface towards the line as well as an outer sealing surface.

In the case, for example, of the aforementioned embodiment with an elastomer body divided in two by a separating surface, the outer sealing surface is then respectively formed both in the circulating direction and in the line direction by two elastomer body parts, i.e. overall by four elastomer body parts.

There is preferably provided here on one of the elastomer body part sections a projection protruding in the direction of the line and formed parallel to the shells, which reaches into a space between the other elastomer body section and shells formed integrally with the latter and preferably also totally fills the latter. The width of the space can correspond here to each of the other spaces respectively filled with a number of shells so that the thickness of the projection preferably also corresponds to a multiple of the shell thickness. The elastomer body part sections are then connected by this plug connection after pushing in in the direction of the line.

In a further embodiment the elastomer body part sections are then furthermore snapped together by a projection protruding transversely (not necessarily perpendicularly) to the direction of the line on one of the two and a recess complementary to this in the other of the two, i.e. secured against undesired sliding apart in the direction of the line.

Both the aforementioned projection extending in the direction of the line and the projection extending transversely to the latter and also the recess can in turn be moulded directly onto the corresponding elastomer body part, for example by means of a complementary cavity or a complementary mould in a moulding tool, and so the production advantageously does not require any additional production step.

This also applies to a further embodiment which relates to elastomer bodies divided by a separating surface and also constitutes an invention independent of the features of the main claim and should be disclosed in this form. Elastomer body halves separated from one another by a separating surface can be connected to one another here by a plug connection between the two elastomer body halves.

A plug connection according to the invention between the elastomer body halves can therefore be produced, for example, with a projection on the one and an indentation accommodating the latter in the other elastomer body half, preferably an indentation complementary to the projection, also without undercutting of the projection and recess the displaceability of the halves in relation to one another in the direction of the line being blocked. It is further preferred if the projection and the indentation can be respectively designed with inclined flanks (for example in relation to the separating surface or the extension of the flanks in relation to one another) so that undercutting then also holds together the elastomer body halves in relation to the distance direction. A pin, for example, diverging towards its free end or a pin with a correspondingly formed free end, for example a spherical attachment, can therefore reach into a complementary recess.

A connection element can be arranged here such that it then lies within the assembled elastomer body or can also be provided on a face side of the latter. A projection extending over the separating surface in the distance direction on an elastomer body half in relation to the direction of the line can thus, for example, constitute a stop, and for example when an end of the projection reaches into the other elastomer body half in the direction of the line, also hold together the two halves in relation to the distance direction. Such plug connections are to be understood in the overall disclosure in such a way that they can optionally also by all means be separated again by applying a corresponding force.

A fitter can then, for example after adapting the dimensions of the through hole, bring together the two halves on the line such that together they enclose the latter. The plug connection then holds together the halves independently of a tensioning device which can optionally also be added later, and the elastomer body can already be guided as a whole into the wall opening or a frame so that fewer individual parts have to be manipulated. Even though this can also facilitate manipulation in the case of a single line to be sealed, it is particularly advantageous to bring together and so also to assign an elastomer body to the respective line in the case of a number of lines; the elastomer body halves can then no longer be interchanged. Furthermore, elastomer body halves which are already brought together are also better secured against slipping and falling out after being inserted into a frame and before pressing.

As also already mentioned at the start, the connection elements can preferably be moulded directly onto the elastomer body parts in a shaping process, and so are then particularly easy to produce.

This also applies generally to the other embodiments, and this is why the elastomer body parts are preferably injection moulded parts, pressed parts or transfer pressed parts. For production, therefore, a flowable plastic material is delivered to a cavity or plastically deformable material is pressed with a mould or a plastic material is foamed, extruded or blown into a mould.

An elastomer body part produced in this way preferably has two shells with a thickness, increasing in this sequence, of preferably less than 1, (0.5), (0.25) mm and between the latter a space with a width in the distance direction, increasing in this sequence, of at least (0.5), 1, 2 mm.

A further preferred embodiment also relates to holding together elastomer body halves separated by a separating surface, in particular the arrangement of a boundary surface separating two shells of a first layer from one another in the circulating direction in relation to the next consecutive boundary surface in the separating surface of a next neighbouring second layer lying on the inside in the distance direction. These two boundary surfaces are therefore offset in relation to one another in the circulating direction so that one of the at least two shells of the first layer separated from one another by the boundary surface rests with its inner lateral surface against the outer lateral surfaces of at least two shells of the second layer (and one of the at least two shells of the second layer separated from one another by the boundary surface with its outer lateral surface on the inner lateral surfaces of at least two shells of the first layer). The shells therefore rest respectively not only against the lateral surface of a closely adjacent shell of the particular elastomer body half, but also partially against the lateral surface of a shell of the other elastomer body half. By means of the shells interlocked with one another in this way, the two elastomer body halves are held together in relation to the distance direction; this also applies under certain circumstances perpendicularly to the separating surface, for example when there is static friction between the lateral surfaces.

The boundary surfaces of the closely adjacent layers following one another in the separating surface are offset in relation to one another in the circulating direction by a multiple of preferably at least 0.25, more preferably of at least (0.5), 1 or 2 of their thickness.

The invention also relates to a set with a plurality of line ducts according to the invention which are different from one another but respectively have any elastomer body which is identical to an elastomer body of the other line ducts in the set. Also conceivable is a set with a plurality of elastomer bodies according to the invention which are different from one another, but which respectively have an elastomer body part which is identical to an elastomer body part of the other elastomer bodies in the set.

The invention also relates to a process for producing an elastomer body and/or a line duct for establishing sealing closure of an opening in a wall through which a line passes. The elastomer body, which in the assembled state in turn produces a series of a number of neighbouring shells, can then be clamped with a tensioning device and so be pressed onto the line. Production is implemented with the following steps:

Providing a one-piece elastomer body part with a plurality of shells following one another in the distance direction, there being a space between two next neighbouring shells. In said distance direction the width of this space corresponds here by its amount to at least a sum of the thicknesses, also measured in the distance direction, of at least two further shells.

Adding at least two further shells provided on at least one further elastomer body part in the space so that the assembled elastomer body has said series of a number of shells neighbouring to one another in the distance direction.

The invention also relates to the use of a corresponding line duct for sealing a power, gas, water, heat, telecommunications, signal or other type of data line in a building wall, ship wall or housing wall.

In the following the invention is described in more detail by means of an exemplary embodiment, it also being possible according to the invention for the individual features to be in different combinations, and relating implicitly to all of the categories of the invention.

FIG. 2 illustrates the elastomer body parts from FIG. 1 in a front view in the direction of the line.

Figure 6:
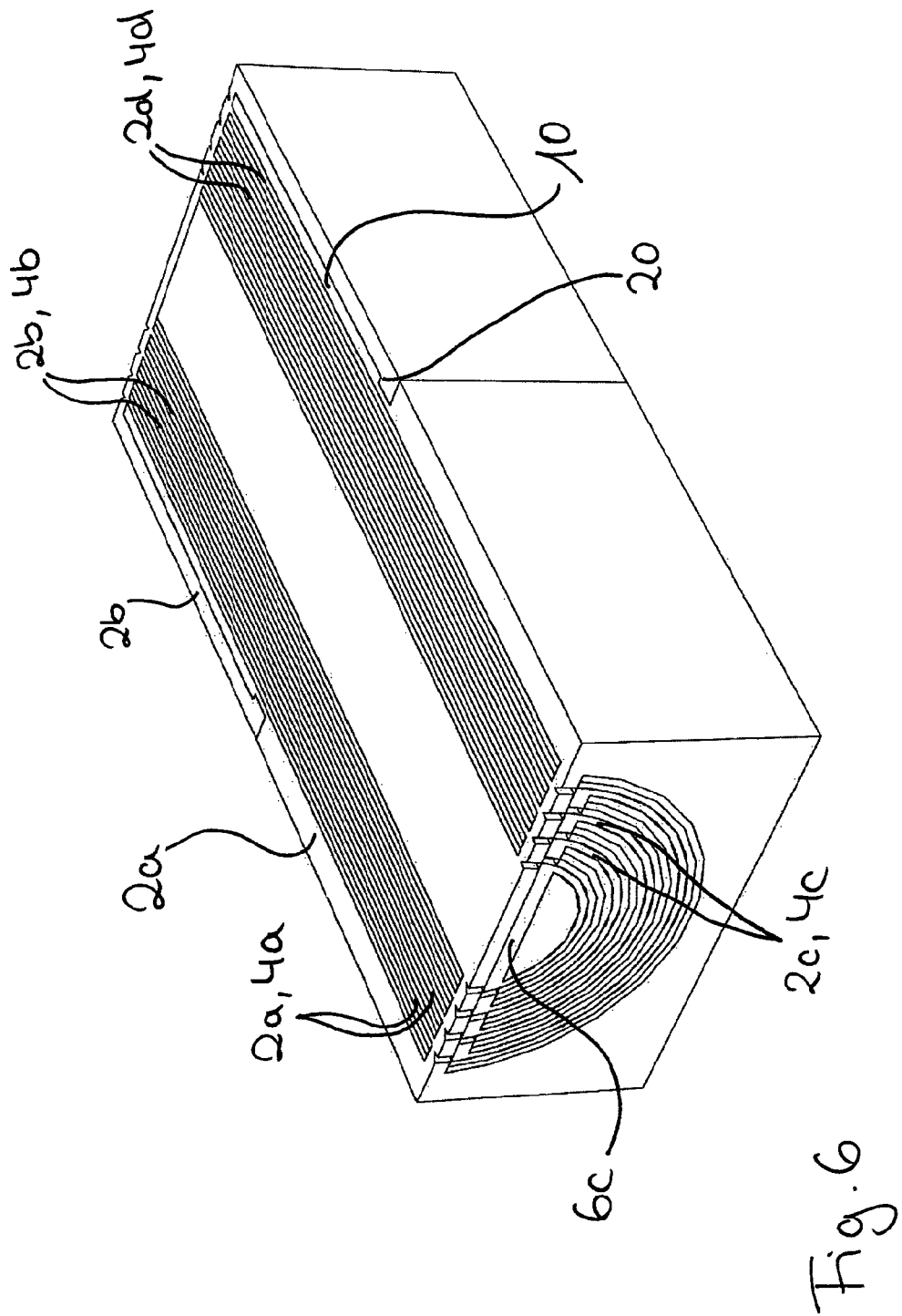
FIG. 6 shows an elastomer body half made up of four elastomer body parts in an oblique view.
Figure 7:
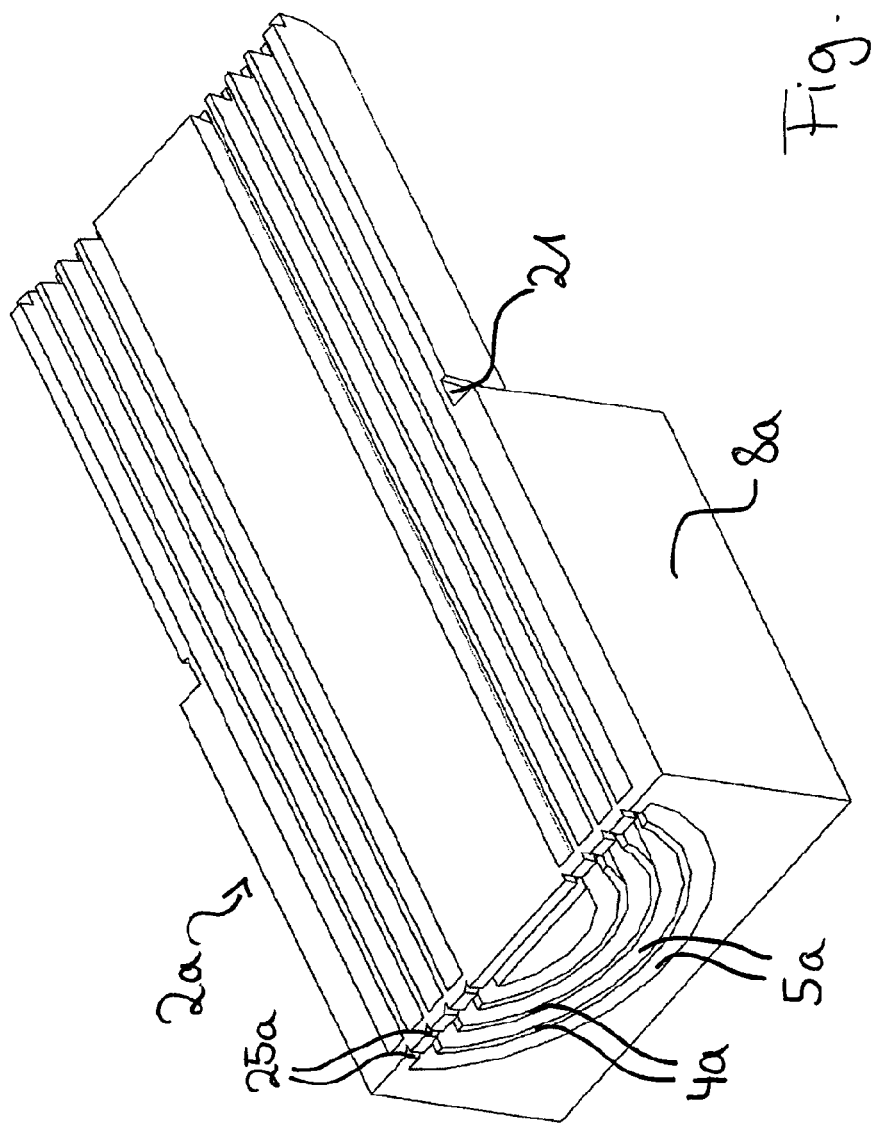

FIGS. 7 to 10 respectively show in an oblique view the four elastomer body parts of the elastomer body half of FIG. 6.

Figure 11:
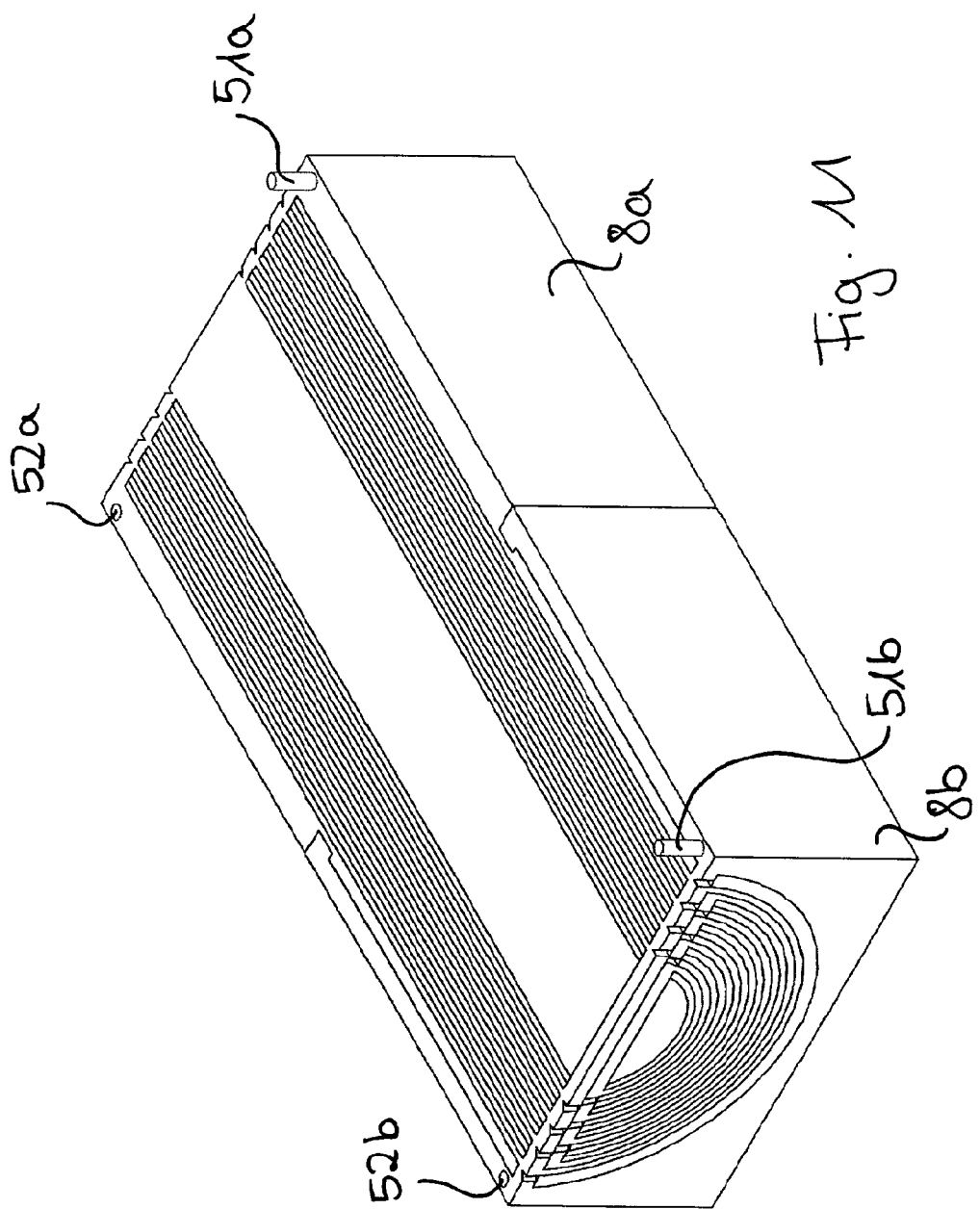

FIG. 11 illustrates an elastomer body half that can be connected to other elastomer body halves by means of plug connections.

Figure 12:
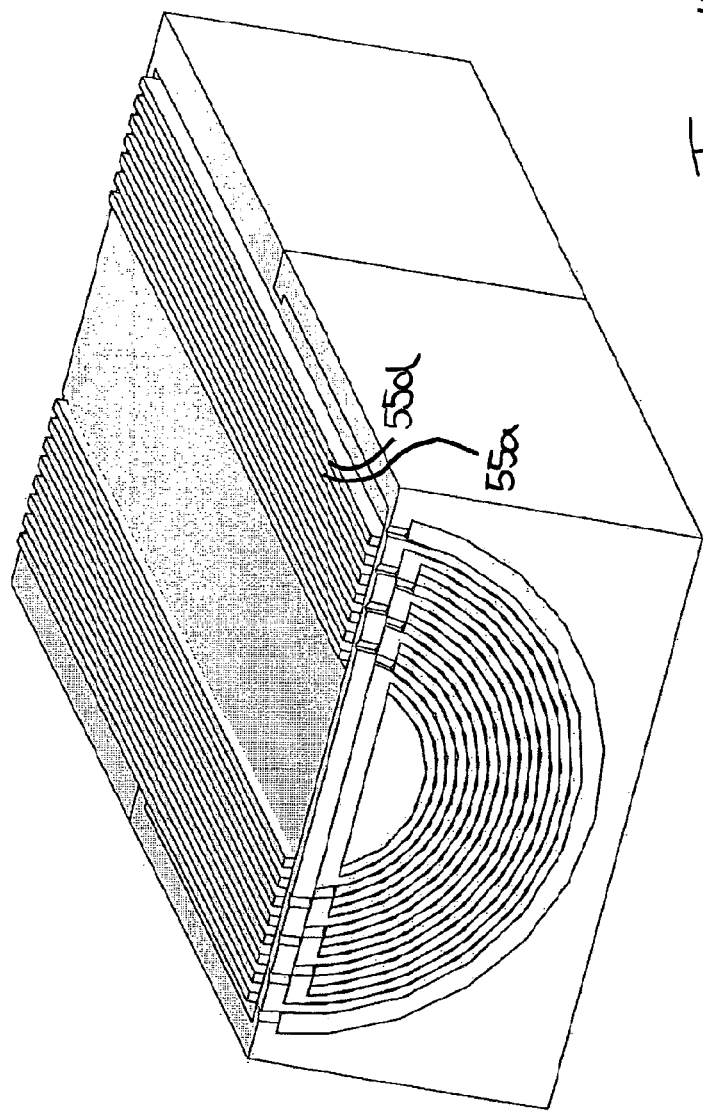

FIG. 12 shows an elastomer body half in which the boundary surfaces of the layers are offset to one another in the circulating direction.

Figure 13:
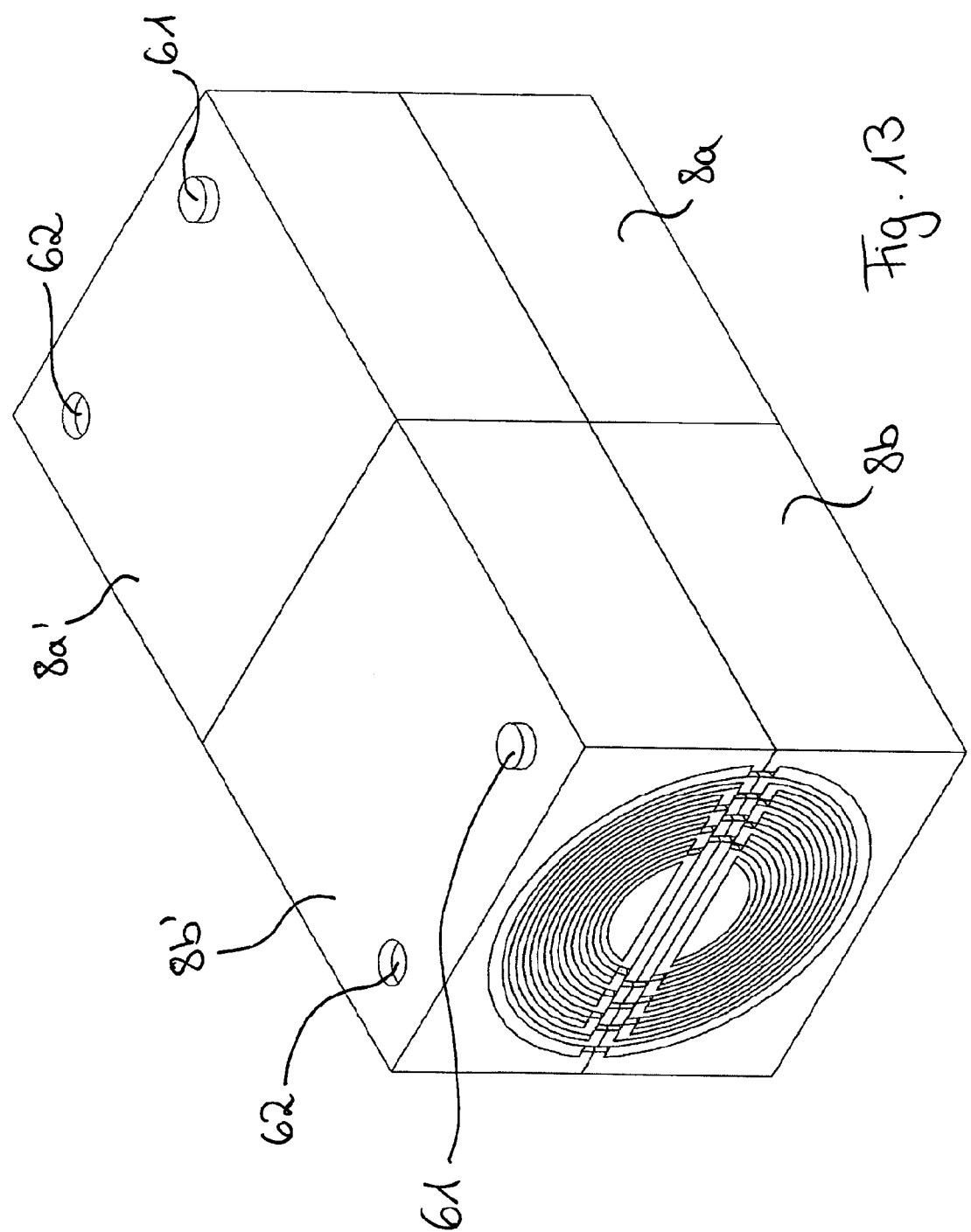

FIG. 13 illustrates an elastomer body made up of two elastomer body halves according to FIG. 12.

Figure 1:
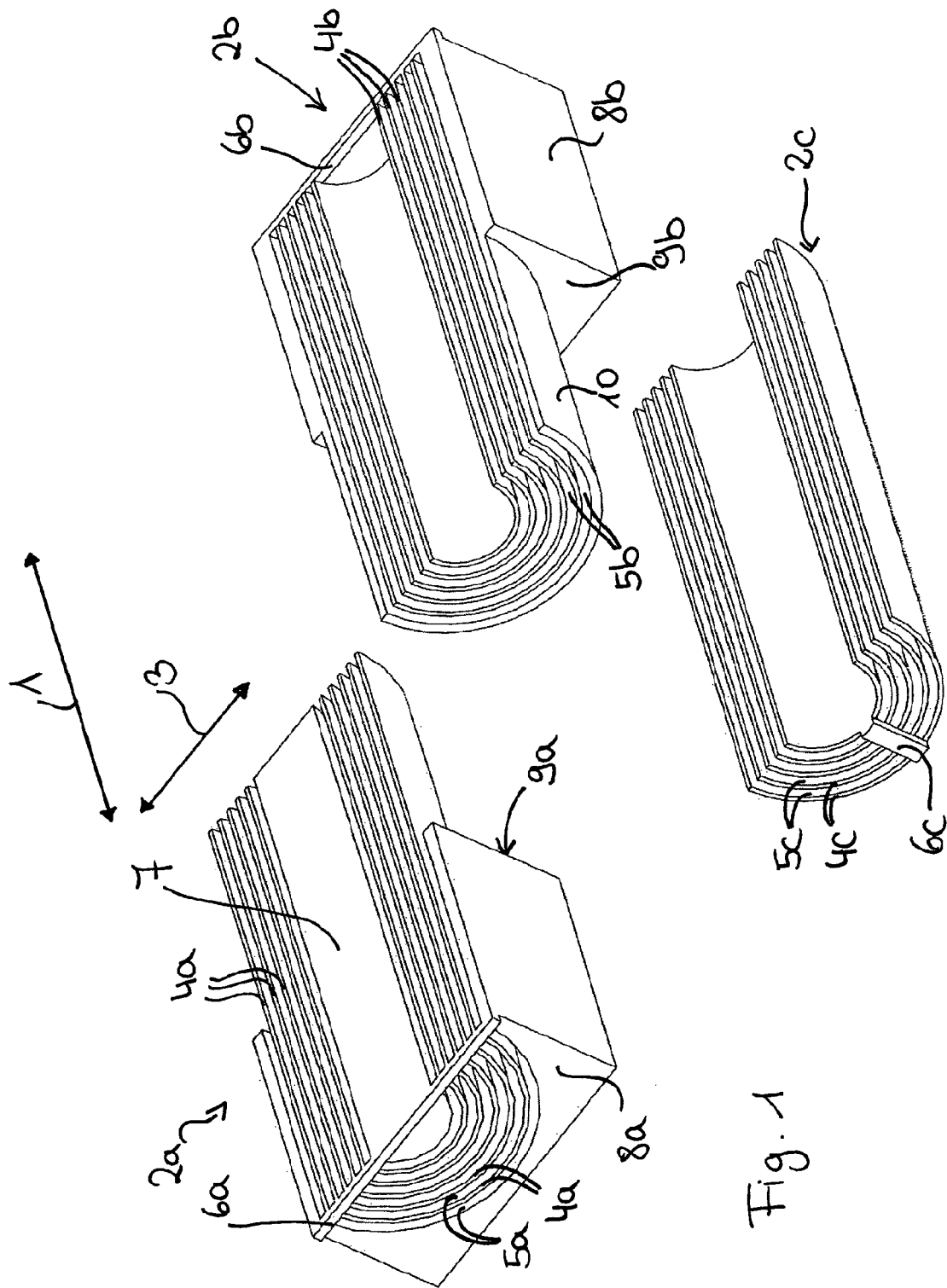
FIG. 1 shows in an oblique view three elastomer body parts together forming an elastomer body half in the assembled state.

The elastomer body parts 2*a, b, c* shown in FIG. 1 in a direction of viewing transverse to the direction of the line 1 respectively have a plurality of shells 4a, b, c next neighbouring to one another in the distance direction 3 and are respectively produced in one piece in an injection moulding process. A space 5a, b, c between the shells 4a, b, c has a width here in the distance direction 3 such that two shells, which respectively belong to other elastomer body parts 2a, b, c, can be arranged in the latter. In this exemplary embodiment the shells 4a, b, c have a uniform thickness, and the width of the spaces 5a, b, c corresponds to a whole number multiple of the latter, and is namely twice as thick as the shells 4a, b, c.

The shells of each series are respectively held together by a bridge 6a, b, c placed on the face side of the shells 4a, b, c, formed integrally with the latter in the same production step.

In the distance direction 3 within the series of shells there is additionally provided on the elastomer body part 2a a blind plug 7 connected to the rest of the elastomer body part 2a by the bridge 6a and which also enables sealing of the wall opening when the line duct is brought forward blindly, i.e. without a line passing through it.

FIG. 2 shows the elastomer body parts 2a, b, c in a front view in the direction of the line and along the direction of viewing FIG. 1. In this illustration it can be seen particularly well that the width of the spaces 5a, b, c is designed such that two shells 4a, b, c of other respective elastomer body parts 2a, b, d can respectively be arranged in every space 5a, b, c. For technical reasons associated with CAD, lines which are actually curved are reproduced here as polygonal lines.

In order to illustrate the assembly of the elastomer body parts 2a, b, c reference is made once again to FIG. 1. The shells 4c of the elastomer body part 2c are first of all introduced into the spaces 5a of the elastomer body part 2a by the face side of the elastomer body part 2c facing away from the observer being brought to the side of the elastomer body part 2a facing towards the observer, and the shells 4c being threaded in here. The bridges 6a can on the one hand be bent at least a little upwards here due to the elastic material properties, and on the other hand the shells 4c not totally filling the spaces 5a on their own also have a certain degree of play, so can in any case be guided past the bridge 6a and be pushed in in the direction of the line until the bridge 6c comes to rest against the face sides of the shells 4a.

The shells 4b of the elastomer body part 2b are then threaded in on the opposite face side of the elastomer body 2a and pushed in in the direction of the line 1 until elastomer body part sections 8a and 8b arranged respectively on the elastomer bodies 2a and 2b in the distance direction 3 outside of the series of shells rest flat against one another with surfaces 9a, b extending transversely to the direction of the line 1. There is provided here on the elastomer body part section 8b of the elastomer body part 2b a projection 10 running parallel to the shells 4b and extending in the direction of the line 1 as far as the face side of the latter, the thickness of which in the distance direction corresponds to twice the shell thickness. This projection 10 then reaches into the outermost space 5a of the elastomer body part 2a in the distance direction 3 so that the elastomer body parts 2a, b, c are securely connected to one another, in any case with regard to a movement in the distance direction 3; the projection 10 totally filling the space thus stabilises the whole shell series of the elastomer body half.

Figure 3:
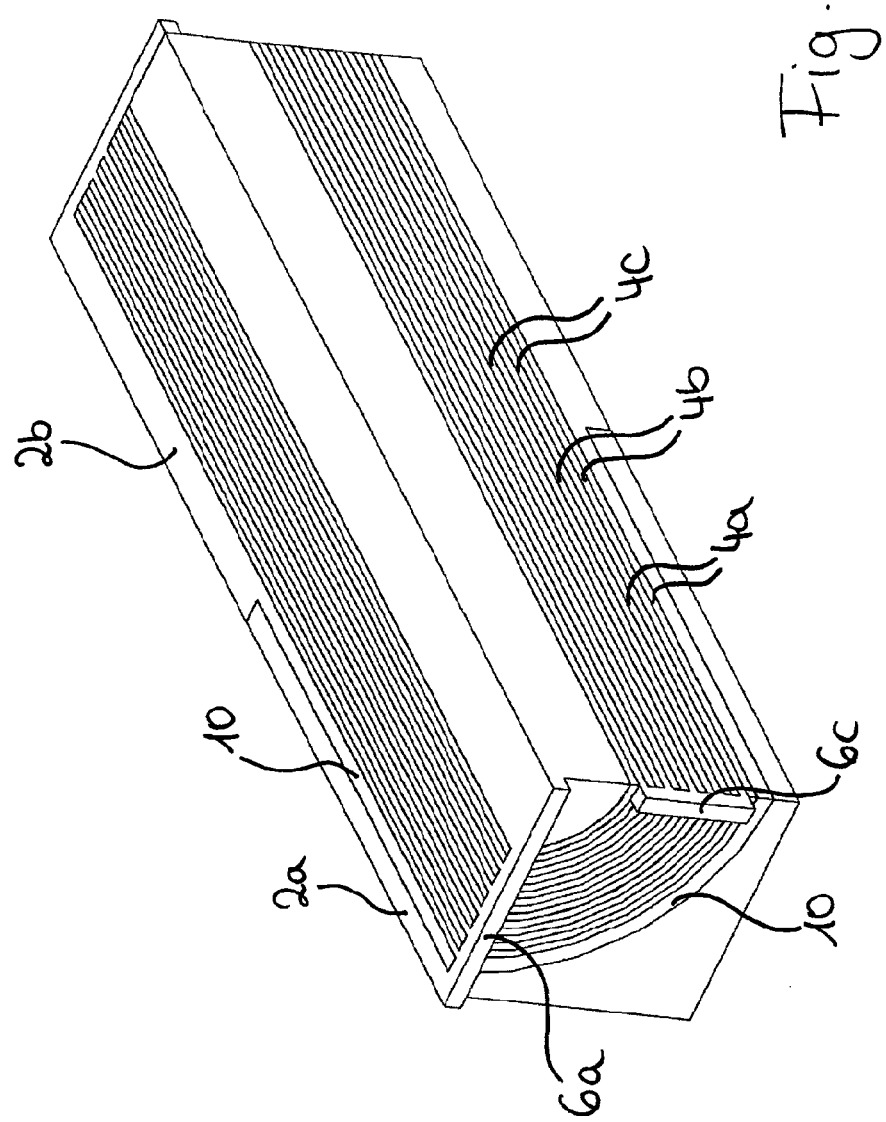
FIG. 3 shows in an oblique view a section through an elastomer body half made up of the three elastomer body parts according to FIGS. 1 and 2.
Figure 4:
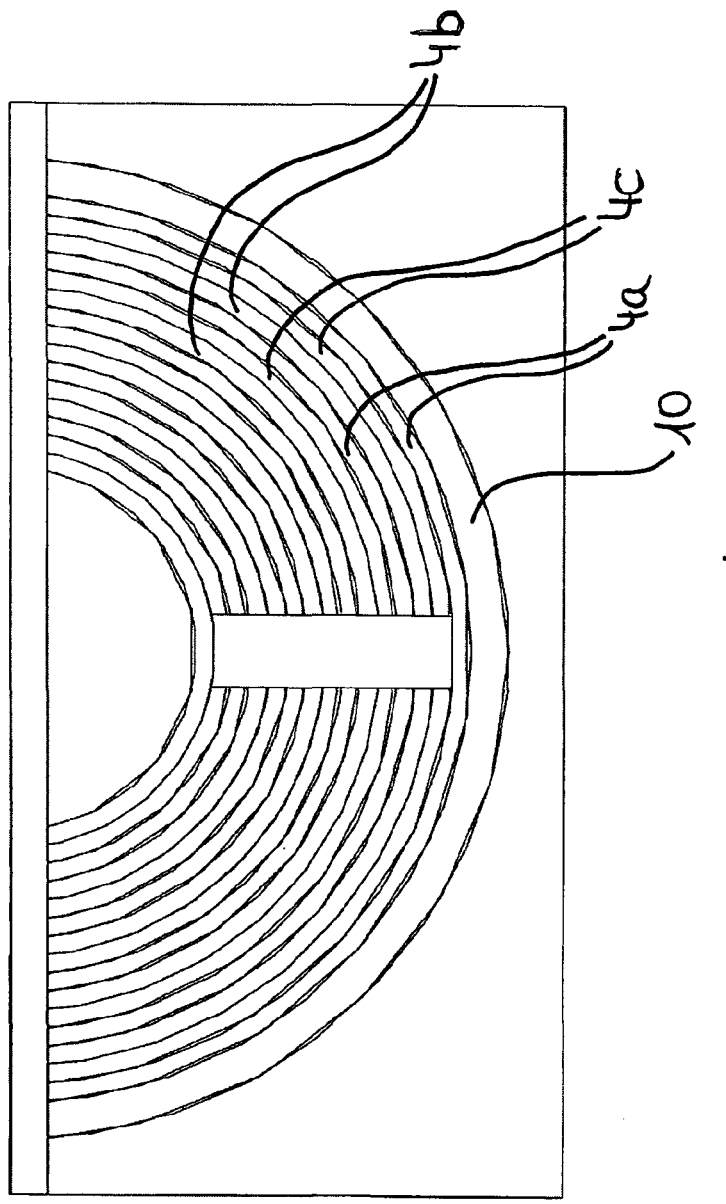
FIG. 4 shows the elastomer body half made up of the elastomer body parts according to FIGS. 1 and 2 in a front view in the direction of the line.

The projection 10 totally filling the space 5a can also be seen in FIGS. 3 and 4. Both in the sectional illustration according to FIG. 4 and in particular in the front view in the direction of the line (opposite to the direction of viewing from FIG. 2) the two shells 4a, b, c of other respective elastomer body parts 2a, b, c respectively further provided for each space 5a, b, c according to the invention can be seen.

Figure 5:
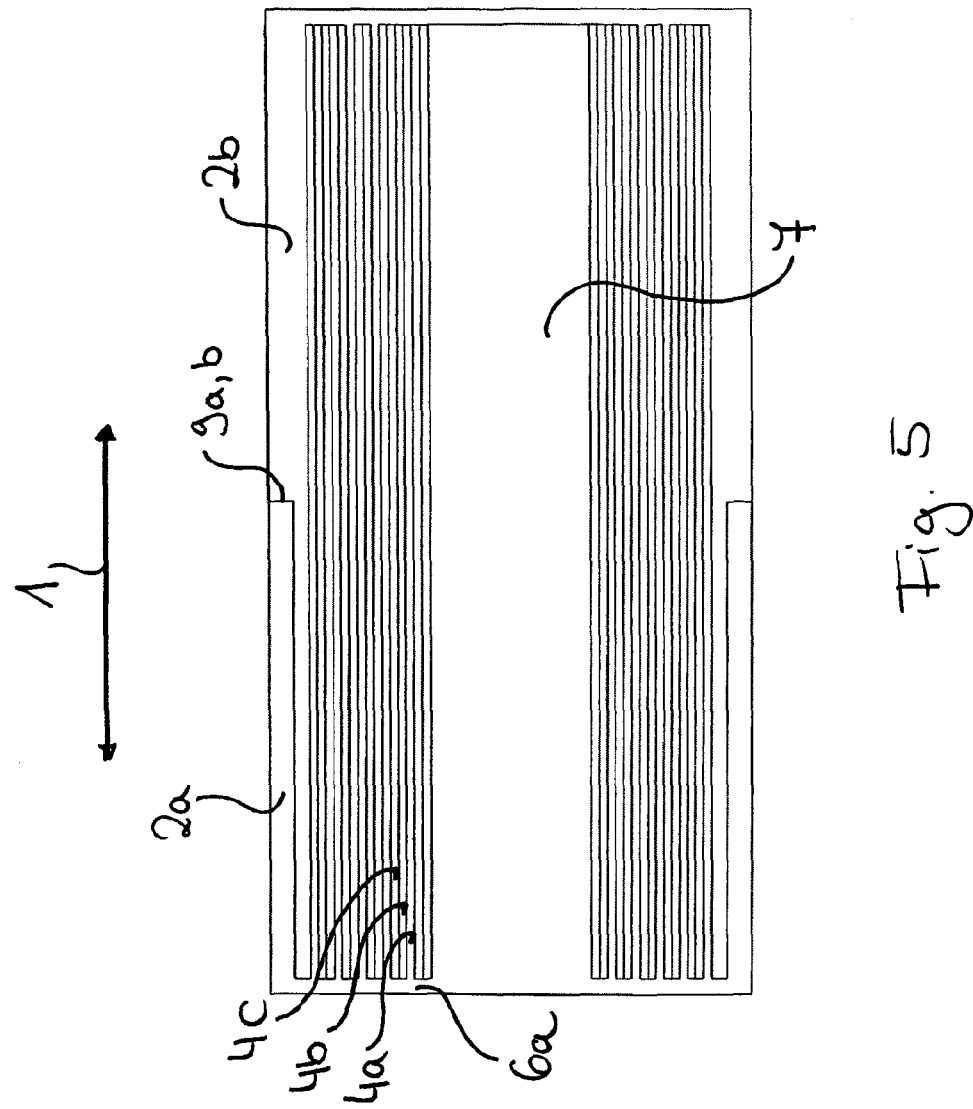
FIG. 5 shows the elastomer body half made up of the elastomer body parts from FIGS. 1 and 2 in a view perpendicular to the direction of the line.

FIG. 5 then shows a view perpendicular to the direction of the line 1, the plane of the drawing coinciding with the separating surface separating two elastomer body halves from one another. A fitter who wishes to adapt the through hole of the elastomer body to a line to be passed through can, starting with the blind plug 7, grasp the latter on a right side (according to the drawing) and move it upwards about the pivot axis predetermined by the bridge 6a. The part of the bridge 6a holding the blind plug 7 can either be "twisted off" here by the rotating motion or also be cut through with a tool. Similarly, according to the diameter of the line a specific number of shells 4a, b, c are then, furthermore, taken from the elastomer body half. The elastomer body half can then be placed on the line together with a further correspondingly prepared half so that in one layer two shells 4a, b, c respectively completely surround the line.

FIG. 5 also illustrates a further advantage of the spaces 5a, b, c respectively accommodating a number of shells 4a, b, c according to the invention. The section of a bridge 6a, b, c between two shells of the same elastomer body part 2a, b, c closely adjacent to one another in the distance direction is longer than the shells are thick, at least twice as long. The bridge section available to the one cutting tool when detaching the shell 4a, b, c is therefore also at least twice as large, by means of which, in particular with particularly thin shells, unintentional detachment of shells 4a, b, c lying further to the outside can be prevented.

FIG. 6 shows an elastomer body half made up of four elastomer body parts 2a, b, c, d, only the shells 4c, d and a bridge 6c of the elastomer body parts 2c and 2d being visible.

For assembly the elastomer body part 2c (FIG. 8) is first of all pushed into the elastomer body part 2a (FIG. 7) in the direction of the line 1 until the bridge 6c of the elastomer body part 2c comes to lie in a complementary recess in the faces sides of the shells 4a of the elastomer body part 2a. The recesses accommodating the bridge 6c of the elastomer body part 2c in the face sides 4a, b, d can respectively be seen in FIGS. 7, 9 and 10 on the face side of the elastomer body parts 2a, b, d facing towards the observer. Since the bridges 6c, d are totally accommodated in the complementary recesses in relation to the direction of the line, the face sides of the assembled elastomer body half are then substantially level.

Figure 8:
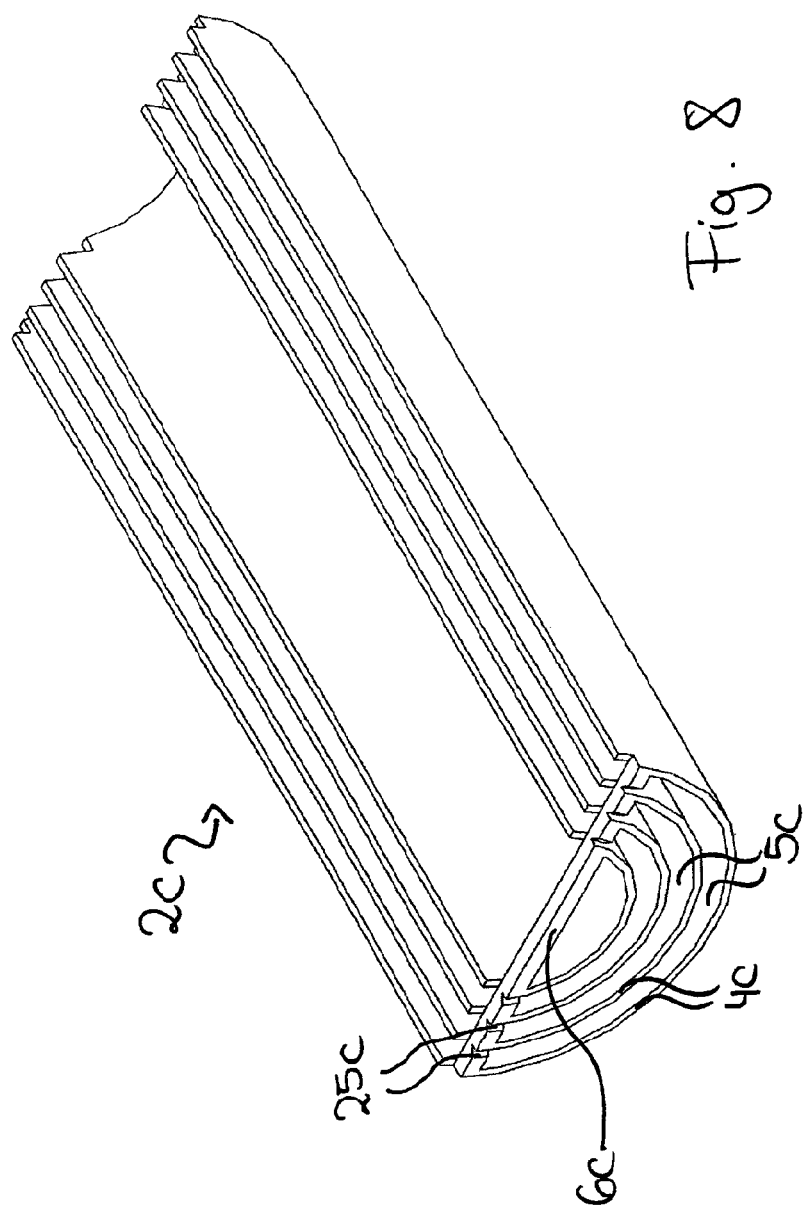
Figure 9:
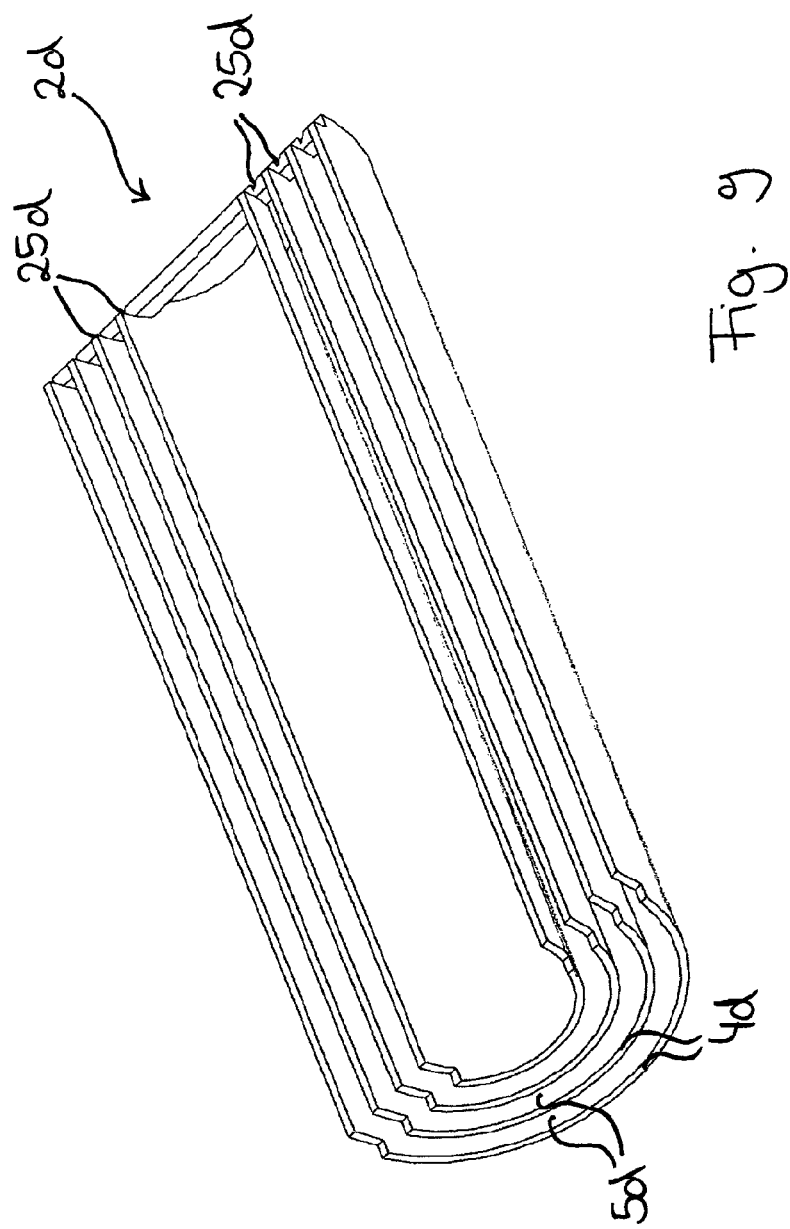
Figure 10:
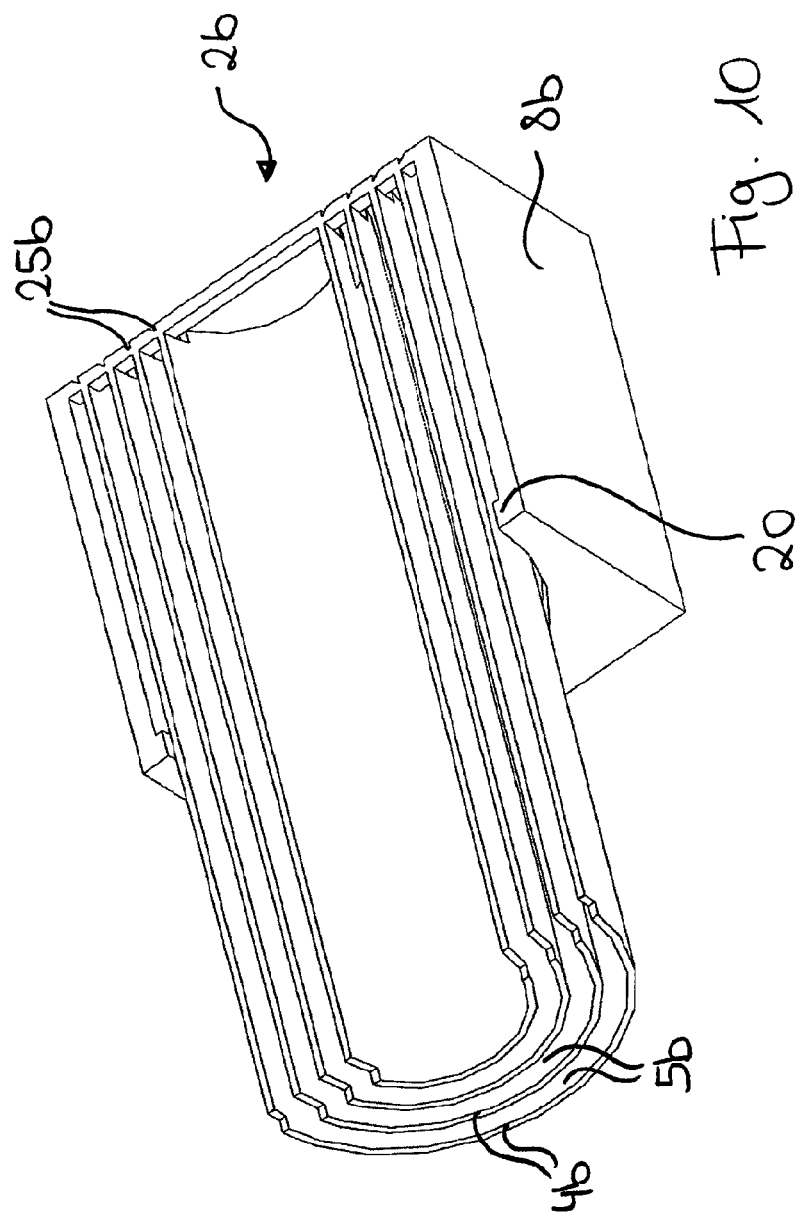

In this exemplary embodiment the bridges 6a, b, c, d are orientated parallel to the separating surface dividing the elastomer body into two halves so that the shells 4a, b, c are respectively held at corners (elastomer body parts 2a and 2b, FIGS. 7 and 10) and are held as close as possible to the latter (elastomer body parts 2c and d, FIGS. 8 and 9).

There can respectively be seen on the bridges 6a, b, c, d a number of marks 25a, b, c, d which can be used as desired breaking points for twisting or tearing off or also as starting points for a cutting tool.

The elastomer body parts 2b (FIG. 10) and 2d (FIG. 9) are assembled in a similar way. The elastomer body parts 2a, c and 2b, d can then be pushed together in the direction of the line 1 until the elastomer body part sections 8a, b come to rest against one another. There is additionally provided on the elastomer body part section 8b an inwardly directed circulating projection 20 (FIG. 10) which then reaches into a complementary recess 21 in the elastomer body part 2a (FIG. 7) so that the elastomer body parts 2a, b, c, d are secured against sliding relative to one another in the direction of the line. Similarly to the exemplary embodiment according to FIGS. 1 to 5 a projection 10 protruding in the direction of the line 1 stabilises the elastomer body half in respect of the distance direction 3.

The elastomer body part sections 8*a* and 8*b* form at the same time an outer sealing surface of the resulting elastomer body which, in relation to the direction of the line, is exclusively formed by these two elastomer body parts 2*a*, *b* and in the circulating direction is then formed together with two further elastomer body parts of the second elastomer body half.

FIG. 11 shows an elastomer body half according to FIG. 6 in which there are provided on the elastomer body part section 8*a*, *b* projections 51*a*, *b* extending into a complementary elastomer body half (not shown). In an assembled elastomer body the latter then reach into complementary indentations 52*a*, *b* of the other elastomer body half and thus hold the two elastomer body halves together.

FIG. 12 shows an elastomer body half assembled similarly to FIG. 6, the shells 4*a*, *b*, *c*, *d* of a layer of boundary surfaces 55*a*, *d* separating from one another in the circulating direction respectively being offset by two shell thicknesses in relation to the next following boundary surfaces 55*b*, *c* in the separating surface in the circulating direction. The boundary surfaces 55*a*, *b*, *c*, *d* of the second elastomer body half (not shown) are offset complementarily for this purpose so that the shells 4*a*, *b*, *c*, *d* of the assembled elastomer body in the region of the separating surface are then interlocked with one another. In this way on the one hand the two elastomer body halves are held together; on the other hand, by means of the offset in the circulating direction possible creapage paths are also extended. Finally, an elastomer body part 2*b*, *c* with exclusively correspondingly set back boundary surfaces 55*b*, *c*, i.e. "shorter" shells, can also be pushed past the material bridge 6*a*, *d* of another elastomer body part 2*a*, *d* more easily when assembling the elastomer body half.

FIG. 13 shows an elastomer body made up of two elastomer body halves according to FIG. 12. There are provided on the outside of the elastomer body part sections projections 61 and indentations 62 by means of which the elastomer body can be put together with a further identically designed elastomer body to form an elastomer body set.

The invention claimed is:

1. A line duct for establishing sealing closure of an opening in a wall through which a line passes, comprising an elastomer body for sealing contact on said line made up of a plurality of one-piece elastomer body parts (2*a*, *b*, *c*, *d*),
  it being possible to clamp said elastomer body with a tensioning device and in this way to press it onto said line such as to form a seal,
  said elastomer body parts (2*a*, *b*, *c*, *d*) being designed to produce, in an assembled state, a series of a number of neighbouring shells (4*a*, *b*, *c*, *d*) in respect of a direction (3) determining a distance from a centre axis of said line,
  in a pressed state of said elastomer body said line being completely surrounded by said shells (4*a*, *b*, *c*, *d*) in each layer of said series,
  a plurality of, in said distance direction (3), consecutive shells (4*a*, *b*, *c*, *d*) being provided on at least one of said elastomer body parts (2*a*, *b*, *c*, *d*)
  and there being a space (5*a*, *b*, *c*, *d*) between two of said shells (4*a*, *b*, *c*, *d*), next neighbouring in said distance direction (3), of said at least one elastomer body part (2*a*, *b*, *c*, *d*),
  in which a shell (4*a*, *b*, *c*, *d*) of an elastomer body part (2*a*, *b*, *c*, *d*) different from said at least one elastomer body part (2*a*, *b*, *c*, *d*) forming said space (5*a*, *b*, *c*, *d*) is arranged,
  characterised in that
  in said space (5*a*, *b*, *c*, *d*) there are arranged a plurality of, in said distance direction (3), next neighbouring shells (4*a*, *b*, *c*, *d*) of at least one other of said elastomer body parts (2*a*, *b*, *c*, *d*), and wherein those of said shells (4*a*, *b*, *c*, *d*) that are next neighbouring to one another in said distance direction (3) in said space (5*a*, *b*, *c*, *d*) respectively belong to others of said elastomer body parts (2*a*, *b*, *c*, *d*).

2. The line duct according to claim 1, in which all of said shells (4*a*, *b*, *c*, *d*) in said series of said shells respectively belong, in a plurality, to a single one of said elastomer body parts (2*a*, *b*, *c*, *d*) respectively.

3. The line duct according to claim 1, in which shells arranged in different spaces (5*a*, *b*, *c*, *d*) of said elastomer body part (2*a*, *b*, *c*, *d*) are connected to at least one of said elastomer body parts (2*a*, *b*, *c*, *d*) by a first bridge (6*a*, *b*, *c*, *d*) provided on an end of said shells (4*a*, *b*, *c*, *d*) in said direction of said line (1) and extending over just part of a face side of the latter.

4. The line duct according to claim 3, in which at least one section of said first bridge (6*a*, *b*, *c*, *d*) is arranged between said shells (4*a*, *b*, *c*, *d*) jumping back in said direction of said line (1) in relation to said face sides of said shells (4*a*, *b*, *c*, *d*) connected by it, and on one face side of at least one of said shells (4*a*, *b*, *c*, *d*) of another one of said elastomer body parts (2*a*, *b*, *c*, *d*) a recess complementary to said section is provided.

5. The line duct according to claim 3, in which said first bridge (6*a*, *b*, *c*, *d*) borders said separating surface transversely to said direction of said line (1) over a whole width of those of said shells (4*a*, *b*, *c*, *d*) connected by it, and so respectively holds said shells (4*a*, *b*, *c*, *d*) at a corner.

6. The line duct according to claim 5, in which there is provided on at least one of said elastomer body parts (2*a*, *b*, *c*, *d*) other than the one having said first bridge (6*a*, *b*, *c*, *d*) a second bridge (6*a*, *b*, *c*, *d*) which is adjacent to said first bridge (6*a*, *b*, *c*, *d*).

7. The line duct according to claim 1, in which in every layer of said series at least two of said shells (4*a*, *b*, *c*, *d*) respectively are adjacent to one another in at least two boundary surfaces (55*a*, *b*, *c*, *d*) per layer, two of said boundary surfaces (55*a*, *b*, *c*, *d*) respectively of each of said layers producing together with two of said boundary surfaces (55*a*, *b*, *c*, *d*) respectively of the other ones of said layers a separating surface running through said line which totally divides said series of said layers.

8. The line duct according to claim 7, in which elastomer body halves separated from one another by said separating surface can be connected to one another by a plug connection between said two elastomer body halves.

9. The line duct according to claim 7, in which at least one of said boundary surfaces (55*a*, *b*, *c*, *d*) of a first one of said layers is offset in a circulating direction in relation to a next following one of said boundary surfaces (55*a*, *b*, *c*, *d*) in said separating surface, of a second one of said layers next neighbouring and lying on an inside in said distance direction (3) such that one of said at least two shells (4*a*, *b*, *c*, *d*) of said first layer rests with an inner lateral surface thereof against outer lateral surfaces of at least two of said shells (4*a*, *b*, *c*, *d*) of said second layer.

10. The line duct according to claim 1, in which at least two of said elastomer body parts (2*a*, *b*, *c*, *d*) respectively have a plurality of said shells (4*a*, *b*, *c*, *d*), there is provided on said at least two elastomer body parts (2*a*, *b*, *c*, *d*), respectively in said distance direction (3) outside of said series of shells, an elastomer body part section (8*a*, *b*), and said elastomer body part sections (8*a*, *b*) together form a sealing surface arranged on an outer circumference of said elastomer body.

11. The line duct according to claim 10, in which on one of said elastomer body part sections (8*a*, *b*) a projection (10) formed parallel to said shells (4*a*, *b*, *c*, *d*) and protruding in said direction of said line (1) is arranged in a space (5*a*, *b*) between the other one of said elastomer body part sections (8*a*, *b*) and an outermost one, in said distance direction (3), of said shells (5*a*, *b*) formed integrally with the latter.

12. The line duct according to claim 10, in which said at least two elastomer body part sections (8*a*, *b*) are clicked together.

13. A process for producing an elastomer body for a line duct for establishing sealing closure of an opening in a wall through which a line passes, for which purpose said elastomer body can be clamped with a tensioning device and in this way can be pressed onto said line such as to form a seal, and furthermore is designed to produce, in an assembled state, a series of a number of shells (4*a*, *b*, *c*, *d*) neighbouring to one another in respect of a direction (3) determining a distance from a centre axis of said line, and in a pressed state of said elastomer body said line in each layer of this series is completely surrounded by said shells (4*a*, *b*, *c*, *d*), comprising the steps:

providing a one-piece elastomer body part (2*a*, *b*, *c*, *d*) with a plurality of said shells (4*a*, *b*, *c*, *d*) following one another in said distance direction (3), there being a space (5*a*, *b*, *c*, *d*) between two next neighbouring, ones of said shells (4*a*, *b*, *c*, *d*), adding at least two of said shells (4*a*, *b*, *c*, *d*) provided on at least one further elastomer body part (2*a*, *b*, *c*, *d*) into said space (5*a*, *b*, *c*, *d*), so that said elastomer body resulting has said series of a number of shells (4*a*, *b*, *c*, *d*) neighbouring to one another in respect of said distance direction (3).

14. A method of sealing a power, gas, water, heat, telecommunications, signal or data line in a building wall, ship wall or housing wall comprising sealing said power, gas, water, heat, telecommunications, signal or data line with the line duct according to claim 1.

* * * * *